(12) United States Patent
// Bahash

US007751983B2

(10) Patent No.: US 7,751,983 B2
(45) Date of Patent: Jul. 6, 2010

(54) TABLE OF BOTANICAL INGREDIENTS AND METHOD OF PREPARING A TABLE USEFUL FOR BLENDING COMBINATIONS THEREOF

(75) Inventor: Timothy Joseph Bahash, Philadelphia, PA (US)

(73) Assignee: 4mula, Inc., Philadelphia, PA (US)

( * ) Notice: Subject to any disclaimer, the term of this patent is extended or adjusted under 35 U.S.C. 154(b) by 1561 days.

(21) Appl. No.: 11/044,161

(22) Filed: Jan. 28, 2005

(65) Prior Publication Data

US 2005/0266102 A1 Dec. 1, 2005

Related U.S. Application Data

(60) Provisional application No. 60/540,294, filed on Jan. 30, 2004.

(51) Int. Cl.
*G06F 19/00* (2006.01)
*G06F 15/00* (2006.01)
*A23L 1/223* (2006.01)
*A61K 8/00* (2006.01)

(52) U.S. Cl. .............................. 702/19; 700/1; 426/638; 512/1

(58) Field of Classification Search ........................ None
See application file for complete search history.

(56) References Cited

U.S. PATENT DOCUMENTS

| | | | | |
|---|---|---|---|---|
| 4,610,890 | A | 9/1986 | Miller et al. | 426/651 |
| 4,707,367 | A | 11/1987 | Miller et al. | 426/96 |
| 4,802,608 | A | 2/1989 | Hofmann | 222/142.1 |
| 5,510,325 | A | 4/1996 | Ehret et al. | 512/5 |
| 5,935,561 | A | 8/1999 | Inman et al. | 424/70.19 |
| 6,103,241 | A | 8/2000 | Hood | 424/195.1 |
| 6,280,751 | B1 | 8/2001 | Fletcher et al. | 424/401 |
| 6,405,019 | B1 | 6/2002 | Murray | 455/67.1 |
| 6,623,767 | B1 | 9/2003 | Morice | 424/745 |

OTHER PUBLICATIONS

Madany Mamlouk et al. Quantifying olfactory perception: mapping olfactory perception space by using multidimensional scaling and self-organizing maps. Neurocomputing vol. 52-54, pp. 591-597 (2003).*
Amazon.com, Review: "The Spice and Herb Bible: A Cook's Guide", by Ian Hemphill; Amazon at www.amazon.com, publication date unknown.
American Herb Association and K. Keville, et al., "Complete Book of Herbs: Using Herbs to Enrich Your Garden, Home, and Health"; Publications International Ltd., 1997, p. 145.
Mary Boldan, "Seasoning Saavy" with "Herb & Spice Chart"; from Conscious Choice at www.consciouschoice.com, 2001.
Ian Hemphill, "The Spice and Herb Bible: A Cook's Guide"; Pan Macmillan Australia Pty Limited, 2002; pp. 147-152, 422-425, and 445.
S. Price et al., "Aromatherapy for Health Professionals"; Churchill Livingstone, 1999; pp. 354-357.
C. Wildwood, "The Encyclopedia of Aromatherapy"; Healing Arts Press, Rochester, VT 1996; pp. 27, 41-47, 231, and 254-285.
S. Worwood et al., "Essential Aromatherapy: A Pocket Guide to Essential Oils & Aromatherapy"; New World Library, Novato, CA, 2003; pp. 116-172.
V.A. Worwood, "The Complete Book of Essential Oils & Aromatherapy"; New World Library, Novato, CA, 1991, pp. 320-324, 342-343, 374-377, and 386-407.

* cited by examiner

*Primary Examiner*—John S Brusca
(74) *Attorney, Agent, or Firm*—Winston Strawn LLP

(57) ABSTRACT

The invention relates to a table of botanical ingredients useful for blending combinations that produce a pleasing, desired organoleptic effect. The botanical ingredients are, for example, essential oils or herbs and spices. The table includes different groups of cells of the table. Each group includes ingredients that possess varying degrees of similarity in one or more characteristics. Each cell corresponds to a single ingredient. The groups are arranged such that adjacent cells in the same or different groups correspond to ingredients that possess the closest similarities in one or more characteristics. The invention further relates to methods of preparing the table.

16 Claims, 6 Drawing Sheets

| UNIVERSAL | | | | | | | | EASTERN |
|---|---|---|---|---|---|---|---|---|
| U: SEASONING | | | | | | S: INDIAN | S: ASIAN | |
| U-01 S Salt (-) BSE | U-02 S(sea) Sea Salt (-) BSE | | | | | S-01 Clp Chili (+) TOP | S-03 Mus Mustard (+) TOP | S-09 Wbi Wasabi (+) TOP |
| H-01 Oni Onion (+) TOP | U-03 Glc Garlic (+) TOP | U-05 P Pepper (+) TOP | U-07 P(c) Cayenne (+) TOP | U-07 Tom Tomato (+) TOP | | S-02 Ppk Paprika (+) TOP | S-06 Tur Turmeric (+) TOP | S-10 Gng Ginger (+) TOP |
| H-01 Chv Chive (-) MID | U-04 Mrj Marjoram (+) MID | U-06 P(w) White P (+) TOP | U-08 P(r) Red P (+) TOP | U-08 Lmn Lemon (+) TOP | | S-04 Crr(-) Curry (mild) (+) TOP | | |
| H-02 Dil Dill (-) MID | H-04 Cev Chervil (+) MID | H-07 Oro Oregano (+) MID | H-10 Bsl Basil (+) MID | H-13 Prs Parsley (-) MID | | S-05 Crr(-) Curry (hot) (+) TOP | S-07 Fng Fenugreek (+) TOP | S-20 All Allspice (-) MID |
| H-03 Mnt Mint (-) MID | H-05 Cly Celery (-) MID | H-08 Svy Savory (-) MID | H-11 Thy Thyme (+) MID | H-14 Sge Sage (+) MID | S-11 Cia Coriander (+) TOP | S-12 Cmi Cumin (+) TOP | S-15 Cdm Cardamom (-) MID | S-18 Cnm Cinnamon (-) MID |
| | H-06 Bay Bay (+) MID | | H-12 Rsm Rosemary (+) MID | H-15 Sff Saffron (-) MID | H-16 Cil Cilantro (+) MID | S-13 Fnl Fennel (+) TOP | S-16 Clv Clove (-) MID | S-19 Ntg Nutmeg (-) MID |
| | | | | | H-17 Tgn Tarragon (+) MID | S-14 Ase Caraway (-) MID | S-17 Mce Mace (-) MID | U-10 Sug(b) Brown Sug (-) BSE |
| | | | | | | | U-11 X(v) Vanilla (-) MID | U-09 Sug Sugar (-) BSE |
| WESTERN | H: EURAMERICAN | | H: MEDITERRANEAN | | H: FUSION | S: FUSION(+) | S: FUSION(-) | U: SWEETENING |
| | | | | | | | | UNIVERSAL |

| U-01 | U-02 | U-05 | U-06 | U-09 | S-01 | S-02 | S-03 | S-08 | S-09 |
|---|---|---|---|---|---|---|---|---|---|
| S<br>Salt<br>(−) BSE | S(sea)<br>Sea Salt<br>(−) BSE | P<br>Pepper<br>(+) TOP | P(w)<br>White P<br>(+) TOP | Tom<br>Tomato<br>(+) TOP | Clp<br>Chili<br>(+) TOP | Ppk<br>Paprika<br>(+) TOP | Mus<br>Mustard<br>(+) TOP | Hrs<br>Horseradish<br>(+) TOP | Wbi<br>Wasabi<br>(+) TOP |

| U-03 | U-04 | U-07 | U-08 | U-10 | S-04 | S-05 | S-06 | S-07 | S-10 |
|---|---|---|---|---|---|---|---|---|---|
| Oni<br>Onion<br>(+) TOP | Glc<br>Garlic<br>(+) TOP | P(c)<br>Cayenne<br>(+) TOP | P(r)<br>Red P<br>(+) TOP | Lmn<br>Lemon<br>(+) TOP | Crr(−)<br>Curry (mild)<br>(+) TOP | Crr(−)<br>Curry (hot)<br>(+) TOP | Tur<br>Turmeric<br>(+) TOP | Fng<br>Fenugreek<br>(+) TOP | Gng<br>Ginger<br>(+) TOP |

| H-01 | H-04 | H-07 | H-10 | H-13 | H-16 | S-12 | S-15 | S-18 | S-20 |
|---|---|---|---|---|---|---|---|---|---|
| Chv<br>Chive<br>(−) MID | Mrj<br>Marjoram<br>(+) MID | Oro<br>Oregano<br>(+) MID | Bsl<br>Basil<br>(+) MID | Prs<br>Parsley<br>(−) MID | Cia<br>Coriander<br>(+) TOP | Cmi<br>Cumin<br>(+) TOP | Cdm<br>Cardamom<br>(−) MID | Cnm<br>Cinnamon<br>(−) MID | All<br>Allspice<br>(−) MID |

| H-02 | H-05 | H-08 | H-11 | H-14 | H-17 | S-13 | S-16 | S-19 | U-10 |
|---|---|---|---|---|---|---|---|---|---|
| Dll<br>Dill<br>(−) MID | Cev<br>Chervil<br>(+) MID | Svy<br>Savory<br>(−) MID | Thy<br>Thyme<br>(+) MID | Sge<br>Sage<br>(+) MID | Cil<br>Cilantro<br>(+) MID | Fnl<br>Fennel<br>(−) TOP | Clv<br>Clove<br>(−) MID | Ntg<br>Nutmeg<br>(−) MID | Sug(b)<br>Brown Sug<br>(−) BSE |

| H-03 | H-06 | H-09 | H-12 | H-15 | | S-14 | S-17 | U-11 | U-09 |
|---|---|---|---|---|---|---|---|---|---|
| Mnt<br>Mint<br>(−) MID | Cly<br>Celery<br>(−) MID | Bay<br>Bay<br>(+) MID | Rsm<br>Rosemary<br>(+) MID | Sff<br>Saffron<br>(−) MID | Tgn<br>Tarragon<br>(+) BSE | Ase<br>Caraway<br>(−) MID | Mce<br>Mace<br>(−) MID | X(v)<br>Vanilla<br>(−) MID | Sug<br>Sugar<br>(−) BSE |

FIG. 5

| U-01<br>S<br>Salt<br>(−) BSE | U-02<br>S(sea)<br>Sea Salt<br>(−) BSE | U-05<br>P<br>Pepper<br>(+) TOP | P(c)<br>Cayenne<br>(+) TOP | U-09<br>Tom<br>Tomato<br>(+) TOP | S-01<br>Clp<br>Chili<br>(+) TOP | S-02<br>Ppk<br>Paprika<br>(+) TOP | S-03<br>Mus<br>Mustard<br>(+) TOP | S-08<br>Hrs<br>Horseradish<br>(+) TOP | S-09<br>Wbi<br>Wasabi<br>(+) TOP |
| --- | --- | --- | --- | --- | --- | --- | --- | --- | --- |
| U-03<br>Oni<br>Onion<br>(+) TOP | U-04<br>Glc<br>Garlic<br>(+) TOP | U-06<br>P(w)<br>White P<br>(+) TOP | U-08<br>P(r)<br>Red P<br>(+) TOP | U-10<br>Lmn<br>Lemon<br>(+) TOP | S-04<br>Crr(−)<br>Curry (mild)<br>(+) TOP | S-05<br>Crr(−)<br>Curry (hot)<br>(+) TOP | S-06<br>Tur<br>Turmeric<br>(+) TOP | S-07<br>Fng<br>Fenugreek<br>(+) TOP | S-10<br>Gng<br>Ginger<br>(+) TOP |
| H-01<br>Chv<br>Chive<br>(−) MID | H-04<br>Mrj<br>Marjoram<br>(+) MID | H-07<br>Oro<br>Oregano<br>(+) MID | H-10<br>Bsl<br>Basil<br>(+) MID | H-13<br>Prs<br>Parsley<br>(−) MID | S-11<br>Cia<br>Coriander<br>(+) TOP | S-12<br>Cmi<br>Cumin<br>(+) TOP | S-15<br>Cdm<br>Cardamom<br>(−) MID | S-18<br>Cnm<br>Cinnamon<br>(−) MID | S-20<br>All<br>Allspice<br>(−) MID |
| H-02<br>Dll<br>Dill<br>(−) MID | H-05<br>Cev<br>Chervil<br>(−) MID | H-08<br>Svy<br>Savory<br>(−) MID | H-11<br>Thy<br>Thyme<br>(+) MID | H-14<br>Sge<br>Sage<br>(+) MID | H-16<br>Cil<br>Cilantro<br>(+) MID | S-14<br>Fnl<br>Fennel<br>(−) TOP | S-16<br>Clv<br>Clove<br>(−) MID | S-19<br>Ntg<br>Nutmeg<br>(−) MID | U-10<br>Sug(b)<br>Brown Sug<br>(−) BSE |
| H-03<br>Mnt<br>Mint<br>(−) MID | H-06<br>Cly<br>Celery<br>(−) MID | H-09<br>Bay<br>Bay<br>(+) MID | H-12<br>Rsm<br>Rosemary<br>(+) MID | H-15<br>Sff<br>Saffron<br>(−) MID | H-17<br>Tgn<br>Tarragon<br>(+) MID | S-14<br>Ase<br>Caraway<br>(−) MID | S-17<br>Mce<br>Mace<br>(−) MID | U-11<br>X(v)<br>Vanilla<br>(−) MID | U-09<br>Sug<br>Sugar<br>(−) BSE |

FIG. 6

TABLE OF BOTANICAL INGREDIENTS AND METHOD OF PREPARING A TABLE USEFUL FOR BLENDING COMBINATIONS THEREOF

REFERENCE TO RELATED APPLICATIONS

This application claims the benefit under 35 U.S.C. §119(e) of U.S. Patent Application No. 60/540,294, filed on Jan. 30, 2004.

FIELD OF INVENTION

The present invention relates to a table of botanical ingredients, such as essential oils and herbs and spices. The table is useful for blending combinations of ingredients that produce a pleasing, desired organoleptic effect. The invention further relates to methods of preparing the table of ingredients.

BACKGROUND ART

Essential oils are extracts from the naturally occurring, aromatic substances found within plants. Through a process of distillation, extraction or expression, the natural essences are obtained from such parts as the fruit, flower, bud, leaf, bark, wood, or root of plants. Within an essential oil is a network of organic chemical compounds sought after for their therapeutic properties. Applied widely throughout the field of holistic medicine and aromatherapy, and having been used as such for centuries, essential oils are experiencing a renaissance within the landscape of health and wellness as a natural, bioavailable alternative to the otherwise synthetically engineered drugs produced by the pharmaceutical industry.

Essential oils are complex mixtures of different organic molecules—terpenes, alcohols, esters, aldehydes, ketones and phenols. Synthetic oils are usually made from one or more of the constituents predominant within a particular essential oil. Menthol, for example, often substitutes for mint and eucalyptol for eucalyptus. However, there are sound reasons for believing that it is the interaction between each and every component that gives an essential oil its particular character and unique therapeutic properties.

Essential oils possess numerous properties, which make them useful for treating many of our most common health and beauty troubles. Essential oils can be useful in the treatment of anxiety and depression. For example, ylang-ylang, citrus oils, jasmine, basil, patchouli and peppermint may be used to treat general depression. Geranium, lavender and bergamot can treat fear and anxiety. Peppermint, rose and carnation improve concentration and eliminate lethargy. Sprayed into the air, these oils also have immediate and long-lasting effects.

The reasons for these reactions are as yet unclear, but it is known that odor molecules are perceived by thousands of tiny nerve cells in the nose and that each of these nerves is connected to that part of the brain which is concerned with emotional drives, creativity and sexual behavior. This could explain why certain perfumes make us feel happy, why some essences, like jasmine and rose, have a reputation for being an aphrodisiac and why unpleasant smells, like petrol fumes, can induce depression.

Essential oils are mainly used in two ways—by inhalation or through topical application. Through inhalation, essential oils stimulate the olfactory system, a network of nerve receptors located inside the nasal passage which carry impulses to the brain, impulses which are then translated to produce our sense of smell, and produce an emotional response. Essential oils are widely used in this application for their uplifting, calming, comforting or inspiring effects upon the balance of our emotional state. Through the topical application of essential oils, such as massage, the therapeutic properties of essential oils are absorbed through the skin and distributed throughout the body. As the molecules of an essential oil are both miniscule and composed of an organic chemistry harmonious with the human body, essential oils are easily absorbed through the skin, and their healing properties are readily distributed to the major ten systems of the human body. In a topical application, the benefits of inhalation are a byproduct, and it is regarded as a holistic approach in which there are both physiological and emotional benefits to mind and body.

Herbs and spices, on the other hand, are conventionally used as flavorings in, for example, Indian or Thai dishes. Herbs and spices are usually the dried, aromatic parts of plants, generally the seeds, berries, roots, pods and sometimes leaves and flesh, which mainly, but not invariably, grow in hot countries.

The medicinal uses of herbs and spices in the past were often indistinguishable from their culinary uses, particularly so in medieval times, when apothecaries prescribed herbs and spices not merely for digestive problems, but for all types of ailments. Hot spices, such as pepper, were regarded as an appetite stimulant and a digestive aid. Asafoetida, now known only in Indian cookery, was used by the Romans as a healing ointment, an antidote for snake bites, and a cure for gout, cramps, pleurisy, and tetanus. Spiced salts were made with ginger, pepper, cumin, thyme and celery seed, which were good for the digestion, promoting regularity and preventing all sorts of illnesses, plagues and chills. Citron seeds were given to pregnant women to relieve nausea. Roman and medieval writers also believed that fennel helped to promote and restore good vision, and it was at one time a cure for obesity.

Because of the great utility of both essential oils and herbs and spices, many have discovered new varieties and formulated specific compositions. For example, U.S. Pat. No. 6,103,241 discloses the essential oil of the shrub kunzea ambigua and two various therapeutic uses of the essential oil. The essential oil is adapted for treatment of ailments of the human body, and is applied topically to relieve pain, minimize bruising and to assist in healing, and may be used either pure or in a carrier.

U.S. Pat. No. 6,280,751 discloses medicinal and cosmetic compositions comprising essential oils in combination with herbs and/or spices. The compositions may be used orally or topically. The compositions may comprise one or more essential oils selected from bergamot, chamomile german, chamomile moroccan, chamomile roman, cinnamon zeylanicum, clove buds, eucalyptus globulus, frankincense, fennel, hyssop, juniper, lemon grass, mountain savoury, niaouli, red thyme, rosemary, rose geranium, tagetes and ylang-ylang. The compositions may also comprise one or more spices selected from asapoetidia, coconut, coriander, fenugreek and horseradish.

U.S. Pat. No. 6,623,767 discloses a composition comprising honey, at least one essential oil and/or at least one essential oil derivative. It also discloses the different uses of the composition in the pharmaceutical, cosmetic and food industries.

U.S. Pat. No. 6,465,019 discloses a spice composition comprising 1 to 30% by weight of garlic, 10 to 50% by weight of onion, 0.2 to 10% by weight of ginger, 5 to 40% by weight of jujube, and 10 to 50% by weight of citrus peel or an extract thereof or 1 to 20% by weight of naringin or hesperidin.

Although the different essential oils and herbs and spices can be combined to yield a pleasing smell or flavor, the mechanism by which oils or herbs and spices should be combined is not well understood. Much of the knowledge is only empirical in nature. Unfortunately, there are no convenient and systematic tools to determine which essential oils or herbs and spices should be combined to be both olfactorily and gustatorily pleasing. Thus, there is a great need for an easy to use tool useful to both those skilled in the art as well as the layperson in determining which ingredients should be combined to obtain a particular smell and/or flavor. Preferably, such a tool would provide a simple systematic approach in determining the combination of different oils or herbs and spices in order to achieve different goals and more preferably, the tool would be in the form of a visual table for quick reference. The present invention satisfies such a need.

SUMMARY OF THE INVENTION

The present invention relates generally to a table of botanical ingredients, for example, essential oils or herbs and spices. The table is useful for blending combinations of ingredients that produce a pleasing, organoleptic effect, such as smell or taste. The table includes different groups of cells. Each group includes ingredients that possess varying degrees of similarity in one or more characteristics, such as taste or flavor. Each cell in the table corresponds to a single ingredient. All of the different groups are arranged in the table in such a way that adjacent cells in the same or different groups correspond to ingredients that possess the closest similarities in one or more characteristics. In a preferred embodiment, the adjacent cells substantially correspond to ingredients that produce a pleasing organoleptic effect when blended.

The present invention also relates to methods of preparing the table of botanical ingredients. In one non-limiting embodiment, the desired organoleptic effect is fragrance and the botanical ingredients are essential oils derived from one or more parts of a plant. In another embodiment, the desired organoleptic effect is flavor, and the botanical ingredients are herbs and spices.

In yet another embodiment, the invention relates to a method for blending combinations of botanical ingredients to produce a pleasing, desired organoleptic effect. This method comprises arranging different groups of ingredients in the cells of a table as noted herein, and selecting different combinations of ingredients from the table for combining to provide the desired organoleptic effect. Preferably, the organoleptic effect is a fragrance or flavor, the table is in an interactive electronic form, wherein each cell contains an indicator for a name of an ingredient and an indicator of sensory response, and the adjacent cells substantially correspond to ingredients that produce a pleasing fragrance or flavor when blended.

BRIEF DESCRIPTION OF THE DRAWINGS

Further features and advantages of the invention can be ascertained from the detailed description that is provided below in connection with the following drawing(s):

FIG. 3 illustrates a preferred embodiment of a table of herbs and spices according to the present invention;

FIG. 4 identifies one blend that may be selected from a table of herbs and spices according to the present invention;

FIG. 5 identifies a second blend that may be selected from a table of herbs and spices according to the present invention; and FIG. 6 identifies a third blend that may be selected from a table of herbs and spices according to the present invention.

DETAILED DESCRIPTION OF THE PREFERRED EMBODIMENTS

Figure 1:
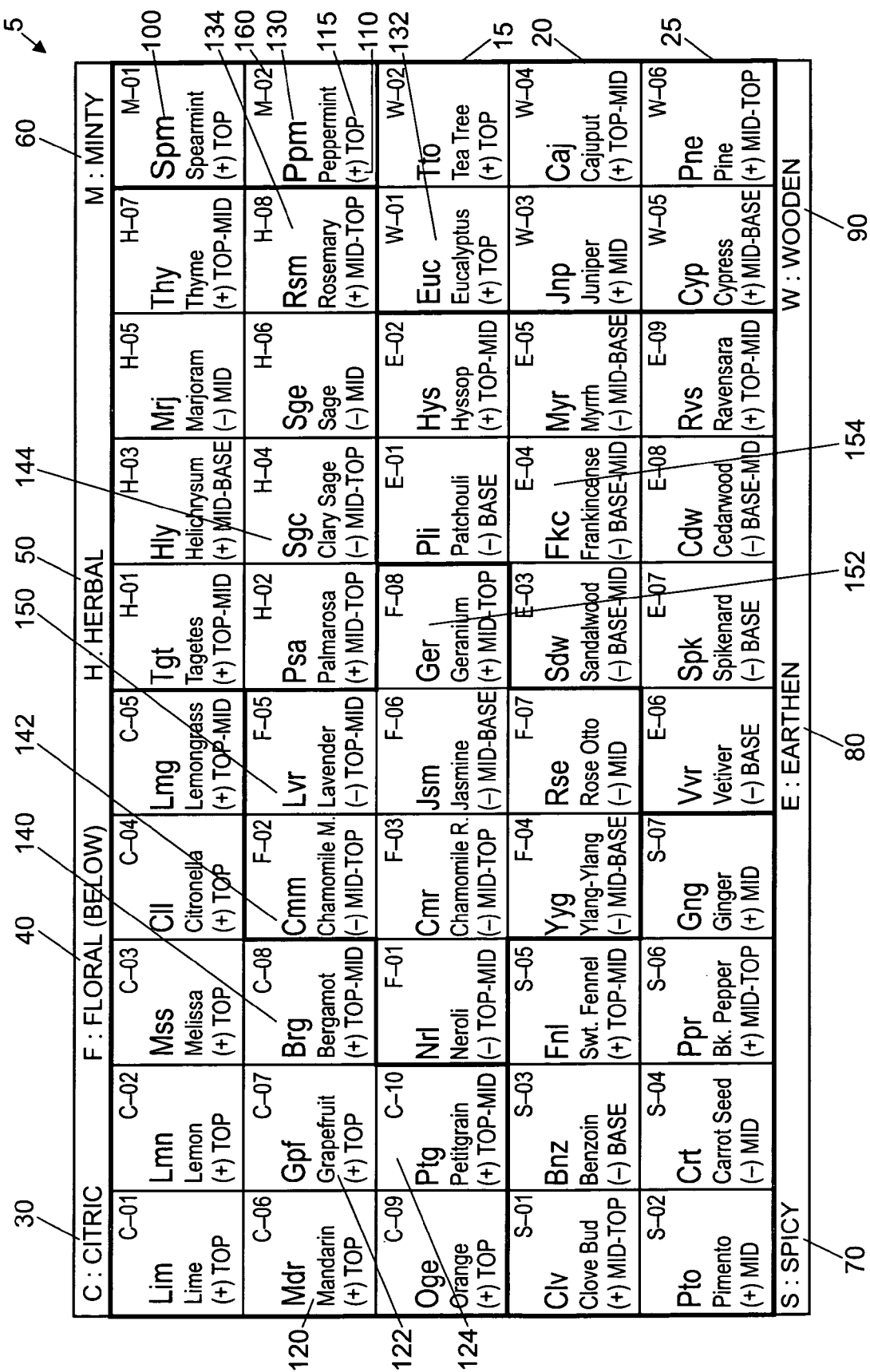
FIG. 1 illustrates a preferred embodiment of a table of essential oils according to the present invention.

The invention relates to a table of botanical ingredients useful for blending combinations that produce a pleasing, desired organoleptic effect. The table includes different groups of cells of the table. Each group includes ingredients that possess varying degrees of similarity in one or more characteristics. The characteristics, for example, are smell, taste, color, or texture. Each cell corresponds to a single ingredient. The groups are arranged in the table such that adjacent cells in the same or different groups correspond to ingredients that possess the closest similarities in one or more characteristics.

In one non-limiting embodiment, the table is in an interactive, electronic form. There are many ways to use the table in this format, but there are three preferred ways. First, to learn about the benefits of an ingredient, such as an essential oil, an ingredient may be selected from the table and its corresponding taxonomy and utilities will typically appear in the scrollable columns below. Second, to identify the ingredients which relate to a specific utility such as a health-related indication, a utility may be selected from scrollable columns on the side of the table, and preferably, relevant cells corresponding to ingredients will be highlighted in the table. Lastly, to learn about the blends of ingredients, a blend may be selected from a drop down menu on the side of the table. Advantageously, its description will appear in a content window, its component ingredients will be highlighted in the table, and its taxonomy and utilities will be listed in the scrollable columns.

In another embodiment, the table is, for example, a three-dimensional object in which ingredients, such as essential oils are stored. The table is generally composed of fifty containers within an outer 10×5 cell grid structure that holds the individual containers in place, and in the positions established by the table. One's use of this table in this fashion makes blending easy, as "compatible" ingredients are positioned together. To further aid the user, both the grid and each container is usually printed with the identification information of each ingredient.

The cells are sufficiently sized to receive and hold containers that house the ingredients within the positions designated by the table. The cells can be designed to fit the container size of choice. Typically, however, the cells range from about 1 inch in length, width, and height to about 3 inches in length, width, and height for convenience. Preferably, the cells are about 2 inches in length, width, and height. More preferably, the cells are about 1.5 inches in length, width, and height. In a most preferred embodiment, the cells are about 1.25 inches in length, width, and height. Advantageously, the cell clusters of the ingredients may then be removed from the grid structure as needed to prepare blends. The structure streamlines the selection and use processes by basing it on a taxonomic arrangement and the understanding of each element within the context of a larger system of natural elements.

The outer dimensions of the cell grid can vary, depending on the tolerances between cell rows so that individual ingredients may be easily removed. The cell grid usually measures from about 10 to 30 inches in length, from about 5 to 15 inches in width, and from about 1 to 3 inches in height. In a preferred embodiment, the outer dimensions of the grid, however, generally measure no smaller than 12.5 inches in length, 6.25 inches in width, and 1.25 inches in height. Additionally, the outer dimensions are preferably about 25 inches in length, 12.5 inches in width, and 2.5 inches in height.

In another preferred embodiment, the grid structure is of a size that fits in a kitchen drawer for easy access and blending of the ingredients. In this embodiment, the dimensions of each cell can also vary, they are generally, however, about 1.25 inches in length, 1.25 inches in width, and 1.25 inches in height. For this embodiment, the dimensions preferably do not exceed 2.5 inches in length, 2.5 inches in width, and 2.5 inches in height.

The dispensing containers typically are of slightly undersized length and width with respect to the grid. On the other hand, the height of each container typically rises an additional 1.25 inches above the grid so that it may be easily removed from the grid structure. Thus, while the length and width of the containers are generally designed to fit within the cell, the height of the container is generally greater than that of the cell to facilitate removal of the container with ease. Dispensing containers usually measure slightly less than about 1.25 inches in length and width, while measuring about 2.5 inches in height. The containers preferably do not exceed 2.5 inches in length, 2.5 inches in width, and 3.5 inches in height.

The grid structure and containers may be made of any suitable sturdy material. The preferred material for the grid is resin. When the ingredient to be stored is an essential oil, the container is advantageously made of amber glass with a phelonic screw and fixed glass dropper. When the ingredient is an herb or spice, the container is preferably shaped as a cube with shaker holes and a pour spout inside and including a lid.

In yet another embodiment, the table is, for instance, in the form of a digital database connected to an ingredient dispenser that dispenses custom blends. Usually, one will select two or more ingredients like essential oils by way of a touch screen, digital interface, or a manual interface, and the blend will preferably be dispensed, for example, onto a scented paper swatch, in a container, or into the air. Advantageously, one can also assign quantities through this method (i.e., 3 parts frankincense, 2 parts lavender and 1 part geranium). If one were to make that particular selection, a total of 6 drops would be dispensed for example, onto paper, into a container, or into the air for the user to smell or taste. This application may take many forms, such as a kiosk of the electronic, interactive form of the table, or a touch screen, or a manual dispenser.

In FIG. 1, the table 5 resembles a periodic table. The cells 15, 20 and 25 correspond to tea tree, cajuput and pine, respectively, and belong to one group. Each cell contains an indicator for a name of an ingredient 100 and an indicator of sensory response 110. The indicator 100 is an abbreviation of the ingredient, and the indicator 110 shows an uplifting or calming sensory response to the ingredient. Also included within a cell is an indicator of the intensity or endurance 115 of a characteristic of an ingredient. The indicator 115 specifies the duration of the characteristic. Each cell further includes a classification number 160. The number 160 indicates in which direction one should read within a group of cells. The number 160 further illustrates in which direction an ingredient's characteristics depart from those of its respective group towards another group.

In a preferred embodiment, the adjacent cells substantially correspond to ingredients that produce a pleasing organoleptic effect when blended. By "substantially" is meant at least 80% of adjacent cells in the table produce a pleasing organoleptic effect, preferably at least 85%, and more preferably at least 90%. The organoleptic effect, for example, is touch, color, flavor, or fragrance.

Ingredients having a similar characteristic are substantially positioned in adjacent cells. "Adjacent" cells are those that border each other. Thus, adjacent cells include not only those cells that are next to each other, but also those that are diagonal to each other. For example, in FIG. 1, the cell corresponding to bergamot 140 is adjacent to the cells corresponding to lemon, melissa, citronella, grapefruit, chamomile moroccan, petitgrain, neroli and chamomile roman. Thus, adjacent cells correspond to ingredients in the table that are "compatible" or produce a pleasing organoleptic effect when blended together.

The present invention also relates to a method of preparing a table of botanical ingredients useful for blending combinations that produce a pleasing, desired organoleptic effect. The method includes arranging different groups of cells of the table. Each group includes ingredients that possess varying degrees of similarity in one or more characteristics, and each cell corresponds to a single ingredient. Groups are arranged in the table such that adjacent cells in the same or different groups correspond to ingredients that possess similarities in one or more characteristics. In a preferred embodiment of the method, the groups are arranged such that the adjacent cells substantially correspond to ingredients that produce a pleasing organoleptic effect when blended.

Where the desired organoleptic effect is fragrance, the botanical ingredients are typically essential oils derived from one or more parts of a plant. Referring to FIG. 1, the table of essential oils 5 is an arrangement based upon the inherent properties, aroma, taxonomy and utility of distinct essential oils classified and structured into a utilitarian system for selection and blending. While this table 5 is not intended to replace professional medical treatment, it is aimed to classify the fundamental attributes and properties of essential oils so that their utility through aromatherapy and alternative medicine may be better understood through its organization. This table of essential oils 5 is the result of extensive research from sources within the field of aromatherapy as a science and an art.

Each essential oil is assigned a perfumery note—top, middle or base—referring to both intensity and endurance with regard to aroma. Top notes are sharp and immediate, yet short-lived. Middle notes are more subdued and longer lasting. Base notes are the heaviest, yet they are the most stable. Blending often incorporates a representative of all three note levels. When the aromatic effect is layered accordingly, middle to base notes slowly reveal as top notes diffuse over time.

Each essential oil is also assigned a positive (+) or negative (−) charge. The aromatherapeutic effect of an essential oil carrying a positive charge yields an awakened sensory response, while a negative charge yields a calmed sensory response.

The groups in the table typically include different classes of fragrances. The different classes include citric, floral, spicy, earthen, wooden or woody, herbal or minty classes. Essential oils that are classified separately, yet positioned adjacent each other, are compatible because they share an aromatic relationship and similar properties. Blends of the classes that yield a pleasing aroma include mixtures of citric-floral, citric-herbal, citric-spicy, spicy-floral, spicy-earthen, floral-herbal, floral-earthen, earthen-woody, herbal-earthen, herbal-woody, herbal-minty and minty-woody. It should be understood that intermixing the above blends would also yield a pleasing aroma or fragrance, as long as there is a common compatible class. For example, a blend of citricherbal-minty will produce a pleasing fragrance since the herbal class is compatible with both the citric class and the minty class.

Figure 2:
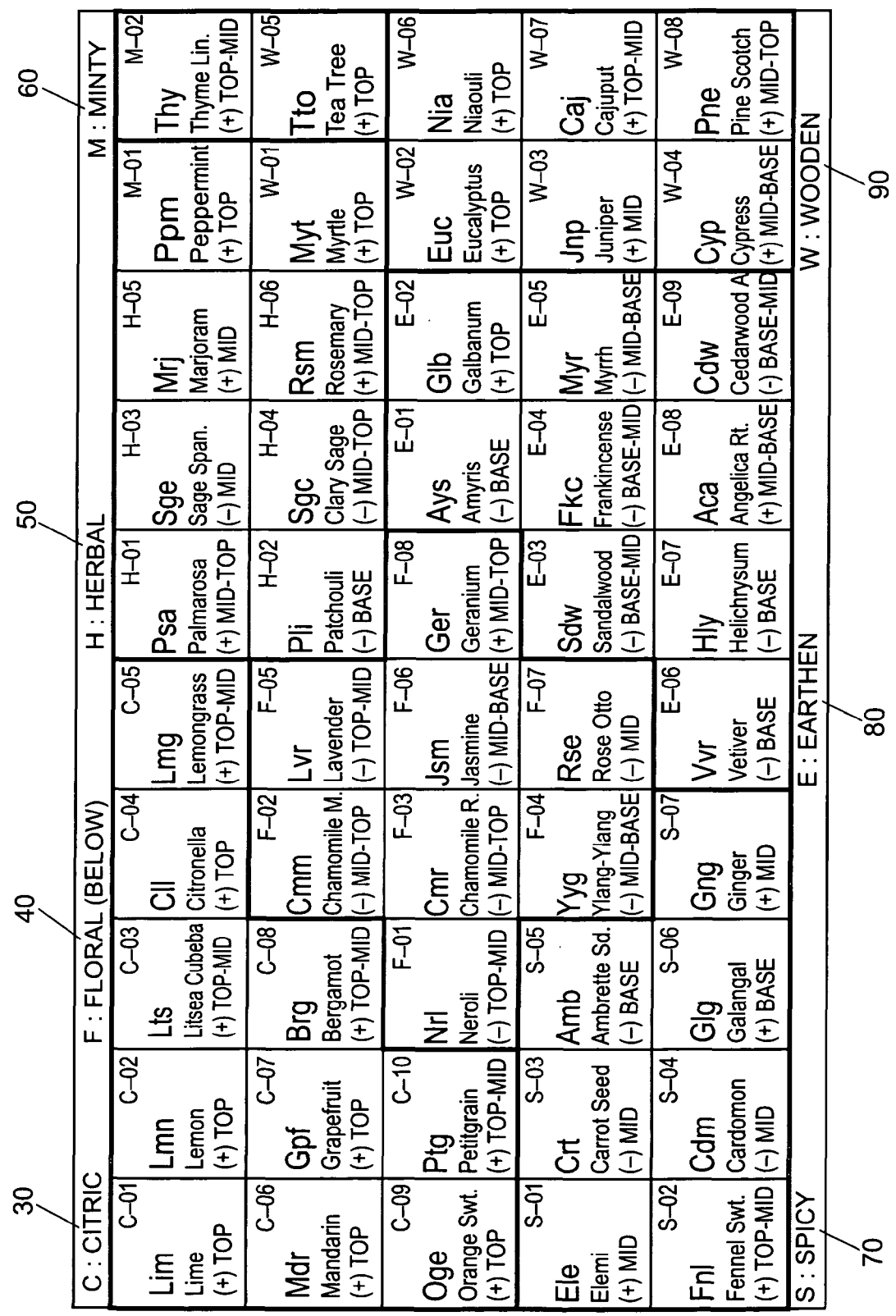
FIG. 2 illustrates another preferred embodiment of a table of essential oils according to the present invention.

In FIGS. 1 and 2, the classes are arranged in the table such that the citric class 30 is positioned adjacent to the floral class 40 and the spicy class 70. The minty class 60 is positioned adjacent to the herbal class 50 and the wooden or woody class 90. In general, the citric class 30 includes lime, lemon, melissa or litsea cubeba, citronella, lemongrass, mandarin, grapefruit, bergamot, orange or orange, sweet and petitgrain; the floral class 40 includes neroli, chamomile moroccan, chamomile roman, ylang-ylang, lavender, jasmine, rose otto or rose moroccan and geranium; the spicy class 70 includes clove bud, pimento, benzoin, carrot seed, sweet fennel, black pepper and ginger; the earthen class 80 includes patchouli, hyssop, sandalwood, frankincense, myrrh, vetiver, spikenard, cedarwood and ravensara; the wooden or woody class 90 includes eucalyptus, tea tree, juniper berry, cajuput, cypress and pine, scotch; the herbal class 50 includes tagetes, palmarosa, helichrysum, clary sage, marjoram, sage, thyme and rosemary; and the minty class 60 includes spearmint and peppermint.

In another embodiment, the spicy class 70 includes elemi, carrot seed, ambrette seed, sweet fennel, cardamom, galangal, and ginger; the earthen class 80 includes anyris, galbanum, sandalwood, frankincense, myrrh, vetiver, helichrysum, angelica root and cedarwood, atlas; the wooden or woody class 90 includes myrtle, eucalyptus, juniper berry, cypress, tea tree, niaouli and pine, scotch; the herbal class 50 includes palmarosa, patchouli, sage, spanish, clary sage, marjoram, and rosemary; and the minty class 60 includes peppermint and thyme, linalol.

As can be seen in FIGS. 1 and 2, the cells in the classes are arranged as shown in the sample table below.

In one embodiment, the method further includes arranging the cells in the groups according to the plant part from which the essential oil is obtained. The plant parts include buds, petals, twigs, needles, berries, rind, nuts, peel, sap, grass, fruits, flowers, seeds, leaves, bark and roots. For example, in FIG. 1, the cells in the citric group 30 are arranged according to particular plant parts. Lime and lemon are placed adjacent to each other since both are taken from the peel of a fruit. Citronella and lemongrass are placed adjacent to each other since they are both taken from the leaves of a plant. Mandarin, grapefruit and bergamot are all taken from the peel of a fruit.

In an alternative embodiment, the left half of the table is organized such that the parts transition from fruits to flowers to seeds from top to bottom, from leaves to bark to roots along the right half of the table from top to bottom, and from fruits and seeds to flowers to leaves to bark and roots from left to right across the table.

In yet another embodiment, the table is organized from fruit to flowers to roots and wood from the top left to the bottom right, and from seeds to flowers to leaves from the bottom left to the top right of the table. As the table relates to nature itself, its structure may be visualized as one would visualize the architecture of a tree, from its root in the ground, up to the wood of the trunk, out the branches and its leaves where seeds produce flowers and fruit.

Conventional blending is generally done within a class, whereas unconventional blending includes different classes. Most blends cross classes to create a shape. For example, the blends can take the shape of a cluster or a diagonal or a horizontal across rows of the table.

To further illustrate the utility of the table, the following examples are given. In FIG. 1, one of the most conventional blends, which is purely of the citric class, is identified. This

| Lime | Lemon | | Citronella | Lemongrass | | Helichrysum | Marjoram | | |
|------|-------|--|------------|------------|--|-------------|----------|--|--|
| Mandarin | | | | Lavender | | | | | |
| Orange | | Neroli | | | | | | | |
| | | | | | | | | | Cajuput |
| | | | Ginger | Vetiver | | | | Cypress | Pine |

FIGS. 1 and 2 also illustrate that the cells may be arranged as shown below:

blend consists of essential oils from the top of the table, and is characterized by a high-pitched scent. The blend consists of

| | Lemon | | Citronella | Lemongrass | | | | | |
|--|-------|--|------------|------------|--|--|--|--|--|
| Mandarin | | | | | | | | | |
| | Petitgrain | | | | Geranium | | | Eucalyptus | |
| | | | Ylang-Ylang | | Sandalwood | Frankincense | | | |
| | | | Ginger | Vetiver | | | | | | mandarin 120, grapefruit 122 and petitgrain 124. This is one of the least experimental blends.

In FIG. 1, another blend consisting of peppermint 130, eucalyptus 132 and rosemary 134 is identified. This blend is equally high-pitched but of an opposite quality—minty. Essentially it is a mirror image of the citric blend yet it is associated with a completely different aromatic sensation of mint.

In FIG. 1, a blend of bergamot 140, chamomile moroccan 142 and clary sage 144 is identified. Similarly, a blend of lavender 150, geranium 152 and frankincense 154 is identified. The two blends are more abstract and unconventional. The bergamot blend crosses three classes while remaining in the same row. Thus, it is an abstract and somewhat unrecognizable blend. The lavender blend is one of the heaviest and driest of the blends. It blends in the direction toward the earthen family, which usually has the heaviest and most lingering of scents.

These blends of essential oils are useful in a variety of applications, such as in cosmetic formulations for bath and beauty products. The blends are useful, for example, as a component in soaps, perfumes, bath oils, shower gels, and the like.

As one can tell from these four examples, there are a variety of ways to use this table. One can blend from within classes or within different classes. The closer the essential oils are, the more likely the ultimate scent will be recognizable when blended. Blending in directions away from a class in the direction of another, or blending across rows or columns using essential oils spaced apart will result in a more abstract scent. This result may be intuitive considering adjacent cells correspond to oils that are compatible with one another, yet the structure of the table itself is unique and has the ability to display this visually. The reason this structure works in this way is because the aesthetics from one class to another transition oil by oil, from left to right, top to bottom, and diagonally. The function of this table is a blender's starting point. It is the blender's structure for experimentation. Nothing prevents anyone from experimenting more radically. The structure of the table is simply a basis for the organization of, and the understanding of relationships between essential oils. The result of a blend is reflected visually. The table may be used to visualize a blend beforehand, and to inform selection and guide the blending process of essential oils toward a desired effect. Thus, the table is both a complex visual database and a tool for experimentation.

Table 1 is a list of the information contained in the tables, and includes the botanical name of each essential oil. Table 2 and Table 3 assist in blending essential oils to fit a particular purpose. Table 2 specifically lists the healing properties of the essential oils, followed by the essential oils that demonstrate that healing property, while Table 3 is a list of the body systems and different ailments that may be treated with essential oils, followed by the essential oils that are effective in treating that system or ailment.

Where the desired organoleptic effect is flavor, the botanical ingredients are herbs and spices. In this case, the groups comprise different use categories of the herbs and spices. The use categories include universal seasoning, universal sweetening, fusion (+) spices, Indian spices, Asian spices, fusion (−) spices, Mediterranean herbs, Euramerican herbs and fusion herbs. Like the table of essential oils, the herbs and spices have been assigned into categories. The basis for the categories is a combination of quality of flavor and ethnic convention. Though many spices cross the boundaries between, for instance, Indian and Asian, the spices generally used in Indian cooking are grouped together and those used in Asian cooking are grouped together. Spices that cross over between the two are positioned outside of the Asian spices category in the Indian spices category, but are positioned adjacent to the Asian spices category. Thus, when one is cooking Asian food, they are selecting from the upper right area of the table and not limited to the underlying boundaries that separate Indian from Asian. In essence, one would more commonly use fenugreek or mustard in Asian cooking than one may use curry. The table serves as less of a separation, and more as a transition. The table is one long transition in which the quality of flavor moves seamlessly across the table. Fusion (+) spices refer to spices that are used more widely between cultures, but are commonly used in hot or salty dishes.

Fusion (+) spices stimulate digestive activity, while fusion (−) spices relax digestive activity. Fusion (−) spices refer to spices that are also used more widely between cultures but are associated with sugar based cooking and sweet dishes.

TABLE 1

LIST OF INFORMATION IN THE TABLES OF ESSENTIAL OILS

| No. | Indicator for Name | Common Name | Botanical Name | Class | Quality | Duration | Sensory Response |
|---|---|---|---|---|---|---|---|
| c-01 | Lim | Lime | [citrus aurantifolia, per.] | Citric | Alive | Top Note | (+) Positive Charge |
| c-02 | Lmn | Lemon | [citrus limon, per.] | Citric | Bright | Top Note | (+) Positive Charge |
| c-03 | Mss | Melissa | [melissa officinalis, fol.] | Citric | Balanced | Top Note | (+) Positive Charge |
| c-04 | Cll | Citronella | [cymbopogon nardus, fol,.] | Citric | Protective | Top Note | (+) Positive Charge |
| c-05 | Lmg | Lemongrass | [cymbopogon citratus, fol.] | Citric | Vital | Top-Middle Note | (+) Positive Charge |
| c-06 | Mdr | Mandarin | [citrus reticulata, per.] | Citric | Confident | Top Note | (+) Positive Charge |
| c-07 | Gpf | Grapefruit | [citrus × paradisi, per.] | Citric | Refreshing | Top Note | (+) Positive Charge |
| c-08 | Brg | Bergamot | [citrus bergamia, per.] | Citric | Purifying | Top Middle-Note | (+) Positive Charge |
| c-09 | Oge | Orange | [citrus aurantium var. amara, per.] | Citric | Uplifting | Top-Note | (+) Positive Charge |
| c-10 | Ptg | Petitgrain | [citrus aurantium var. amara, fol.] | Citric | Secure | Top-Middle Note | (+) Positive Charge |
| c-01 | Lim | Lime | [citrus aurantifolia, per.] | Citric | Alive | Top Note | (+) Positive Charge |
| c-02 | Lmn | Lemon | [citrus limon, per.] | Citric | Bright | Top Note | (+) Positive Charge |
| c-03 | Lts | Litsea Cubeba | [litsea cubeba, per.] | Citric | Balanced | Top-Middle Note | (+) Positive Charge |
| c-04 | Cll | Citronella | [cymbopogon nardus, fol,.] | Citric | Protective | Top Note | (+) Positive Charge |
| c-05 | Lmg | Lemongrass | [cymbopogon citratus, fol.] | Citric | Vital | Top-Middle Note | (+) Positive Charge |
| c-06 | Mdr | Mandarin | [citrus reticulata, per.] | Citric | Confident | Top Note | (+) Positive Charge |
| c-07 | Gpf | Grapefruit | [citrus × paradisi, per.] | Citric | Refreshing | Top Note | (+) Positive Charge |
| c-08 | Brg | Bergamot | [citrus bergamia, per.] | Citric | Purifying | Top Middle-Note | (+) Positive Charge |
| c-09 | Oge | Orange, Sweet | [citrus sinensis, per.] | Citric | Uplifting | Top Note | (+) Positive Charge |
| c-10 | Ptg | Petitgrain | [citrus aurantium var. amara, fol.] | Citric | Secure | Top-Middle Note | (+) Positive Charge |
| f-01 | Nrl | Neroli | [citrus aurantium var. amara, flos.] | Floral | Meditative | Top-Middle Note | (−) Negative Charge |

TABLE 1-continued

LIST OF INFORMATION IN THE TABLES OF ESSENTIAL OILS

| No. | Indicator for Name | Common Name | Botanical Name | Class | Quality | Duration | Sensory Response |
|---|---|---|---|---|---|---|---|
| f-02 | Cmm | Chamomile, Moroccan | [Ormenis Flower] [*ormenis multicaulis*, flos.] | Floral | Level | Middle-Top Note | (−) Negative Charge |
| f-03 | Cmr | Chamomile, Roman | [*chamaemelum nobile*(=*anthemis nobilis*), flos.] | Floral | Healing | Middle-Top Note | (−) Negative Charge |
| f-04 | Yyg | Ylang-Ylang | [*cananga odorata, v. genuina* flos.] | Floral | Sensual | Middle-Base Note | (−) Negative Charge |
| f-05 | Lvr | Lavender | [*lavandula angustifolia*(=*L. officinalis, L. vera*), flos] | Floral | Normalizing | Top-Middle Note | (−) Negative Charge |
| f-06 | Jsm | Jasmine | [*jasminum grandiflorum*(=*J. officinale, J. sambac*), flos.] | Floral | Euphoric | Middle-Base Note | (−) Negative Charge |
| f-07 | Rse | Rose Otto | [*rosa centifolia R. damascena*, flos.] | Floral | Evocative | Middle Note | (−) Negative Charge |
| f-08 | Ger | Geranium | [*pelargonium graveolens*, fol.] | Floral | Abstract | Middle-Top Note | (−) Negative Charge |
| f-01 | Nrl | Neroli | [*citrus aurantium* var. *amara*, flos.] | Floral | Meditative | Top-Middle Note | (−) Negative Charge |
| f-02 | Cmm | Chamomile, Moroccan | [*ormenis multicaulis*, flos.] | Floral | Level | Middle-Top Note | (−) Negative Charge |
| f-03 | Cmr | Chamomile, Roman | [*chamaemelum nobile*(=*anthemis nobilis*), flos.] | Floral | Healing | Middle-Top Note | (−) Negative Charge |
| f-04 | Yyg | Ylang-Ylang | [*cananga odorata, v. genuina* flos.] | Floral | Sensual | Middle-Base Note | (−) Negative Charge |
| f-05 | Lvr | Lavender | [*lavandula angustifolia*(=*L. officinalis, L. vera*), flos] | Floral | Normalizing | Top-Middle Note | (−) Negative Charge |
| f-06 | Jsm | Jasmine | [*jasminum officinale v grandiflorum*, flos.] | Floral | Euphoric | Middle-Base Note | (−) Negative Charge |
| f-07 | Rse | Rose, Moroccan | [*rosa × centifolia*, flos.] | Floral | Evocative | Middle Note | (−) Negative Charge |
| f-08 | Ger | Geranium | [*pelargonium graveolens*, fol.] | Floral | Abstract | Middle-Top Note | (−) Negative Charge |
| s-01 | Clv | Clove Bud | [*syzgium aromaticum*(-*eugenia caryophyllata*), flos.) | Spicy | Pungent | Middle-Top Note | (+) Positive Charge |
| s-02 | Pto | Pimento | [*pimenta officinalis*, per.fol.] | Spicy | Comforting | Middle Note | (+) Positive Charge |
| s-03 | Bnz | Benzoin | [*styrax benzoin*, res. dist.] | Spicy | Soothing | Base Note | (−) Negative Charge |
| s-04 | Crt | Carrot Seed | [*daucus carota*, fruct.] | Spicy | Regenerative | Middle Note | (−) Negative Charge |
| s-05 | Fnl | Fennel, Sweet | [*foeniculum vulgare* var. *dulce*, fruct.] | Spicy | Sweet | Top-Middle Note | (+) Positive Charge |
| s-06 | Ppr | Black, Pepper | [*piper nigrum*, fruct.] | Spicy | Tempered | Middle-Top Note | (+) Positive Charge |
| s-07 | Gng | Ginger | [*zingiber officinale*, rhiz.] | Spicy | Warm | Middle Note | (+) Positive Charge |
| s-01 | Ele | Elemi | [*canarium luzonicum*, res.] | Spicy | Pungent | Middle Note | (+) Positive Charge |
| s-02 | Crt | Carrot Seed | [*daucus carota*, fruct.] | Spicy | Regenerative | Middle Note | (−) Negative Charge |
| s-03 | Amb | Ambrette Seed | [*abelmoschus moschatus*, fruct.] | Spicy | Tempered | Base Note | (−) Negative Charge |
| s-04 | Fnl | Fennel, Sweet | [*foeniculum vulgare* var. *dulce*, fruct.] | Spicy | Sweet | Top-Middle Note | (+) Positive Charge |
| s-05 | Cdm | Cardamon | [*elettaria cardamomum*, fruct.] | Spicy | Soothing | Middle Note | (−) Negative Charge |
| s-06 | Glg | Galangal | [*alpinia officinarum*, rhiz.] | Spicy | Dry | Base Note | (+) Positive Charge |
| s-07 | Gng | Ginger | [*zingiber officinale*, rhiz.] | Spicy | Warm | Middle Note | (+) Positive Charge |
| e-01 | Pli | Patchouli | [*pogostemon patchouli*, fol.] | Earthen | Alluring | Base Note | (−) Negative Charge |
| e-02 | Hys | Hyssop | [*hyssopus officinalis*, flos. fol.] | Earthen | Pure | Top-Middle Note | (+) Positive Charge |
| e-03 | Sdw | Sandalwood | [*santalum album*, lig. rad.] | Earthen | Central | Base-Middle Note | (−) Negative Charge |
| e-04 | Fkc | Frankincense | [*boswellia carteri*, res.] | Earthen | Inspired | Base-Middle-Note | (−) Negative Charge |
| e-05 | Myr | Myrrh | [*commiphora myrrha* var. *molmol* (=*C. molmol, balsamodendron myrrha*), res. dist.] | Earthen | Meditative | Middle-Base-Note | (−) Negative Charge |
| e-06 | Vvr | Vetiver | [*vetiveria zizanioides*, rad.] | Earthen | Grounded | Base Note | (−) Negative Charge |
| e-07 | Spk | Spikenard | [*nardostachys jatamansi*(=*N. grandiflora*), rad.] | Earthen | Exotic | Base Note | (−) Negative Charge |
| e-08 | Cdw | Cedarwood | [*cedrus atlantica*, lig.] | Earthen | Contemplative | Base-Middle-Note | (−) Negative Charge |
| e-09 | Rvs | Ravensara | [*ravensara aromatica*, fol.] | Earthen | Intoxicating | Top-Middle-Note | (+) Positive Charge |
| e-01 | Ays | Amyris | [*amyris balsamifera*, lig.] | Earthen | Intoxicating | Base Note | (−) Negative Charge |
| e-02 | Glb | Galbanum | [*ferula galbaniflua*, res.] | Earthen | Exotic | Top Note | (+) Positive Charge |
| e-03 | Sdw | Sandalwood | [*santalum album*, lig. rad.] | Earthen | Central | Base-Middle Note | (−) Negative Charge |
| e-04 | Fkc | Frankincense | [*boswellia carteri*, res.] | Earthen | Inspired | Base-Middle-Note | (−) Negative Charge |
| e-05 | Myr | Myrrh | [*commiphora myrrha* var. *molmol* (=*C. molmol, balsamodendron myrrha*), res. dist.] | Earthen | Meditative | Middle-Base-Note | (−) Negative Charge |
| e-06 | Vvr | Vetiver | [*vetiveria zizanioides*, rad.] | Earthen | Grounded | Base Note | (−) Negative Charge |
| e-07 | Hly | Helichrysum | [*helichrysum angustifolium*, flos.] | Earthen | Empowering | Base Note | (−) Negative Charge |
| e-08 | Aca | Angelica Root | [*angelica archangelica*, rhiz.] | Earthen | Pure | Middle-Base Note | (+) Positive Charge |
| e-09 | Cdw | Cedarwood, Atlas | [*cedrus atlantica*, lig.] | Earthen | Contemplative | Base-Middle Note | (−) Negative Charge |
| w-01 | Euc | Eucalyptus | [*eucalyptus globulus, v. globulus*, fol.] | Wooden | Sterile | Top Note | (+) Positive Charge |
| w-02 | Tto | Tea Tree | [*melaleuca alternifolia*, fol.] | Wooden | Medicinal | Top Note | (+) Positive Charge |
| w-03 | Jnp | Juniper Berry | [*juniperus communis*, fruct.] | Wooden | Penetrating | Middle Note | (+) Positive Charge |
| w-04 | Caj | Cajuput | [*melaleuca leucendendron*, fol.] | Wooden | Vivid | Top Middle Note | (+) Positive Charge |
| w-05 | Cyp | Cypress | [*cupressus sempervirens*, fol.] | Wooden | Restorative | Middle-Base Note | (+) Positive Charge |
| w-06 | Pne | Pine, Scotch | [*pinus sylvestris*, fol.] | Wooden | Natural | Middle-Top Note | (+) Positive Charge |
| w-01 | Myt | Myrtle | [*myrtus communis*, fol.] | Wooden | Aerial | Top Note | (+) Positive Charge |
| w-02 | Euc | Eucalyptus | [*eucalyptus globulus, v. globulus*, fol.] | Wooden | Sterile | Top Note | (+) Positive Charge |
| w-03 | Jnp | Juniper Berry | [*juniperus communis*, fruct.] | Wooden | Penetrating | Middle Note | (+) Positive Charge |
| w-04 | Cyp | Cypress | [*cupressus sempervirens*, fol.] | Wooden | Restorative | Middle-Base Note | (+) Positive Charge |
| w-05 | Tto | Tea Tree | [*melaleuca alternifolia*, fol.] | Wooden | Medicinal | Top Note | (+) Positive Charge |
| w-06 | Nia | Niaouli | [*melaleuca viridiflora*, fol.] | Wooden | Elevating | Top Note | (+) Positive Charge |

TABLE 1-continued

LIST OF INFORMATION IN THE TABLES OF ESSENTIAL OILS

| No. | Indicator for Name | Common Name | Botanical Name | Class | Quality | Duration | Sensory Response |
|---|---|---|---|---|---|---|---|
| w-07 | Caj | Cajeput | [*melaleuca cajeputi*, fol.] | Wooden | Vivid | Top-Middle Note | (+) Positive Charge |
| w-08 | Pne | Pine, Scotch | [*pinus sylvestris*, fol.] | Wooden | Natural | Middle-Top Note | (+) Positive Charge |
| h-01 | Tgt | Tagetes | [*tagetes minuta*(=*T. glandulifera, T. patula, T. erecta*), flos.] | Herbal | Powerful | Top-Middle Note | (+) Positive Charge |
| h-02 | Psa | Palmarosa | [*cymbopogon martinii*, var. *motia*, fol.] | Herbal | Intriguing | Middle-Top Note | (+) Positive Charge |
| h-03 | Hly | Helichrysum | [*helichrysum angustifolia*(=*H. italicum*), flos.] | Herbal | Empowering | Middle-Base Note | (+) Positive Charge |
| h-04 | Sgc | Clary Sage | [*salvia sclarea*, flos., fol.] | Herbal | Ambiguous | Middle-Top Note | (−) Negative Charge |
| h-05 | Mrj | Marjoram | [*origanum marjorana*, flos, fol.] | Herbal | Open | Middle Note | (−) Negative Charge |
| h-06 | Sge | Sage | [*salvia officinalis*, fol.] | Herbal | Free | Top-Middle Note | (−) Negative Charge |
| h-07 | Thy | Thyme | [*thymus vulgaris* (*ct. geraniol, ct. linalool*), herb.] | Herbal | Clean | Top-Middle-Note | (+) Positive Charge |
| h-08 | Rsm | Rosemary | [*rosmarinus officinalis* (*ct. cineoleli, ct. camphor*), fol.] | Herbal | Stimulating | Middle-Top Note | (+) Positive Charge |
| h-01 | Psa | Palmarosa | [*cymbopogon martinii* v. *martinii*, fol.] | Herbal | Intriguing | Middle-Top Note | (+) Positive Charge |
| h-02 | Pli | Patchouli | [*pogostemon cablin*, fol.] | Herbal | Alluring | Base Note | (−) Negative Charge |
| h-03 | Sge | Sage, Spanish | [*salvia lavandulifolia*, fol.] | Herbal | Free | Middle Note | (−) Negative Charge |
| h-04 | Sgc | Clary Sage | [*salvia sclarea*, flos., fol.] | Herbal | Ambiguous | Middle-Top Note | (−) Negative Charge |
| h-05 | Mrj | Marjoram | [*origanum marjorana*, flos, fol.] | Herbal | Open | Middle Note | (−) Negative Charge |
| h-06 | Rsm | Rosemary | [*rosmarinus officinalis*, flos, fol.] | Herbal | Stimulating | Middle-Top Note | (+) Positive Charge |
| m-01 | Spm | Spearmint | [*metha spicata*, fol.] | Minty | Elevating | Top Note | (+) Positive Charge |
| m-02 | Ppm | Peppermint | [*mentha × piperita*, sol.] | Minty | Visual | Top Note | (+) Positive Charge |
| m-01 | Ppm | Peppermint | [*mentha × piperita*, flos., fol.] | Minty | Visual | Top Note | (+) Positive Charge |
| m-02 | Thy | Thyme, Linalol | [*thymus vulgaris ct. linalool*, flos., fol.] | Minty | Clean | Top-Middle Note | (+) Positive Charge |

TABLE 2

LIST OF HEALING PROPERTIES OF ESSENTIAL OILS

| PROPERTIES | INDICATORS FOR NAMES OF ESSENTIAL OILS |
|---|---|
| Analgesic | Lvr Euc Jnp Clv Tto Ppm Mrj Ppr Gng Pto Lmg Brg Cmr Jsm Glb Nia Caj Rsm |
| Antibotic/Antibacterial | Cmm Cmr Lvr Tto Caj Euc Ptg Lmn Ppm Mrj Ger Pne Rsm Sge Clv Thy Brg Ppr Psa Cdw Nrl Rvs Rse Lmg Psa Gpf Lim Lts Cll Yyg Fnl Glg Gng Glb Sdw Myr Hly Aca Myt Jnp Nia Pli Sge Oge |
| Antidepressant | Cmm Cmr Psa Bnz Jsm Lmg Mdr Gpf Brg Oge Nrl Yyg Lvr Rse Ger Sdw Pli Sge Sgc |
| Antifungal | Spk Tto Thy Fnl Clv Tgt Psa Lmg Cll Oge Nrl Ger Myr Hly Aca Cdw Pli Mrj Rsm |
| Anti-inflammatory | Cmm Fkc Ptg Oge Lmn Myr Euc Ppm Fnl Hly Hys Jnp Lvr Tto Ger Pne Pli Rse Rsm Clv Thy Spk Bnz Jsm Cmr Ele Crt Sdw Aca Sge Sgc Glb |
| Antioxidant | Cmr Fkc Rvs Pto Lmg Gng Aca Mrj Rsm Thy |
| Antiseptic | Cmm Cmr Pne Thy Ppm Lvr Rsm Clv Rvs Spk Bnz Crt Cll Pto Gpf Jsm Lmg Psa Lim Lmn Lts Mdr Brg Oge Ptg Nrl Yyg Rse Ger Ele Fnl Cdm Glg Gng Ays Glb Sdw Fkc Myr Vvr Aca Cdw Myt Euc Tto Nia Caj Pne Pli Sge Sgc Mrg Hly Cyp |
| Antispasmodic | Cmm Cmr Yyg Ptg Brg Lmn Mdr Myr Cyp Fnl Hly Lvr Caj Mss Ppm Spk Mrj Ger Rsm Sge Sgc Clv Thy Spm Jsm Lnd Cll Ptg Rse Amb Cdm Gng Glb Sdw Vvr Aca Euc Jnp Nia |
| Antitoxic | Crt Rvs Gpf Fnl Jnp Rse Lmn Brg Lvr Pli Thy |
| Antiviral | Myr Lmn Cyp Euc Ppr Rvs Sge Thy Hly Tto Psa Lim Rse Pne Mrj Ppm Pli |
| Aphrodesiac | Jsm Yyg Sdw Rse Nrl Crt Cdm Glg Gng Glb Cdw Jnp Pli Sgc Rsm Thy |
| Astringent | Gpf Rsm Lim Spm Lmg Lnd Lmn Rse Ger Sdw Fkc Myr Hly Cdw Myt Jnp Cyp Pli Sge Sgc Ppm Thy |
| Circulatory Stimulant | Pto Rsm Sge Thy Vvr Fnl Hly Lmg Psa Yyg Rse Ger Crt Glg Aca Cdw Cyp Nia Pne |
| Circatrizant, vulnerary | Bnz Hly Pli Rse Rsm Sge Clv Tgt Thy Hys Lvr Ger Fkc Cdw Brg Lmn Myr Ppm Jsm Psa Nrl Cmr Ele Glb Sdw Hly Euc Jnp Tto Nia Sgc |
| Deodorant | Bnz Cll Lmg Lmn Pne Euc Brg Ptg Nrl Lvr Ger Cyp Pli Sge Sgc Lts |
| Depurative | Lmn Gpf Rse Crt Fnl Vvr Aca Euc Jnp Sge |
| Digestive | Cmr Nrl Oge Brg Lmn Mdr Fnl Hly Hys Jnp Mss Ppm Mrj Ger Ppr Rsm Sge Thy Gng Crt Bnz Clv Lvr Myr Pto Spm Psa Gpf Lmg Lts Ptg Cdm Glb Fkc Aca Caj Pli Sgc |
| Diuretic | Lmn Cyp Ppm Fnl Hys Jnp Mrj Rsm Sge Sdw Thy Bnz Crt Spm Lmg Gpf Cll Mdr Brg Lvr Ger Cdm Glb Fkc Hly Aca Cdw Euc Pne Pli Sgc |
| Emmenagogic | Cmm Cmr Myr Fnl Jnp Caj Ppm Mrj Rse Rsm Sge Sgc Vvr Lvr Ger Crt Cll Glb Fkc Aca Thy |
| Expectorant | Fkc Lmn Myr Euc Ppm Hys Jnp Caj Mrj Pne Ppr Rvs Rsm Sge Thy Gng Bnz Spm Jsm Ele Fnl Glb Sdw Hly Aca Cdw Myt Tto Nia |
| Immunostimulant | Fkc Lmn Tto Pli Clv Thy Lim Lts Cll Brg Oge Lvr Myr Hly Myt Euc Jnp Nia Caj Pne Sge Ppm |
| Insecticide | Cll Euc Caj Ppm Ger Lvr Pli Sge Clv Thy Lmg |
| Insect Repellant | Lmn Lts Cll Lmg Brg Lvr Ger Sdw Euc Cyp Caj Pne Pli Rsm |
| Ophthalmic | Cmr Crt Thy |
| Sedative | Cmm Cmr Yyg Nrl Ptg Oge Brg Lmn Mdr Myr Cyp Jnp Lvr Mss Spk Mrj Ger Sdw Bnz Jsm Lnd Lts Lmg Ays Fkc Vvr Cdw Myt Sgc |

TABLE 2-continued

LIST OF HEALING PROPERTIES OF ESSENTIAL OILS

| PROPERTIES | INDICATORS FOR NAMES OF ESSENTIAL OILS |
|---|---|
| Stimulant | Jsm Cll Rsm Clv Thy Ppm Pto Spm Hly Psa Gpf Brg Oge Ptg Nrl Lvr Ger Ele Crt Amb Fnl Cdm Glg Gng Aca Euc Nia Pne Pli Sge Mrj Mdr |
| Tonic | Cmm Cmr Fkc Ptg Oge Myr Ppm Hys Lvr Rse Sdw Thy Gng Crt Cll Pto Gpf Lmg Psa Lim Lmn Mdr Brg Nrl Yyg Jsm Ger Ele Fnl Cdm Glb Vvr Aca Cdw Jnp Cyp Caj Pli Sge Sgc Mrj Rsm |

TABLE 3

LIST OF BODY SYSTEMS AND AILMENTS THAT MAY BE TREATED WITH ESSENTIAL OILS

INDICATORS FOR NAMES OF ESSENTIAL OILS

UTILITY: SYSTEMS

| | |
|---|---|
| Circulatory System | Ppr Cyp Euc Ger Gng Lmn Lmg Nrl Pne Rse Rsm Thy Fkc Fnl Sge Vvr Lim Lts Mdr Gpf Oge Cmr Yyg Lvr Crt Amb Glg Glb Myr Hly Aca Jnp Nia Sgc Mrj Ppm |
| Digestive System | Cmr Fnl Ppm Brg Gng Oge Lvr Lmn Rsm Sge Thy Hys Jnp Mss Nrl Mdr Spm Mrj Ger Lim Lts Ptg Rse Crt Amb Cdm Glg Glb Sdw Myr Hly Aca Psa Sgc Ppm Lmg Cmm |
| Endocrine System | Ger Rsm Pne Fkc Myr Fnl Sge Cmr Yyg Jsm Rse Crt Cdm Sdw Pli Sgc |
| Immune System | Lmg Rsm Tto Euc Mrj Fkc Lvr Lmn Pli Thy Vvr Rvs Lim Lts Cll Brg Oge Hly Aca Myt Jnp Nia Caj Pne Sge Ppm Myr |
| Integumentary System | Cmm Cmr Lvr Caj Cdw Ger Jnp Pli Tto Ppm Rsm Pne Lmn Hly Fnl Fkc Lmg Ptg Psa Yyg Oge Rse Lim Lts Cll Mdr Gpf Brg Nrl Jsm Ele Crt Glb Sdw Vvr Aca Myr Euc Cyp Nia Sge Sgc Mrj Thy Myt |
| Muscular-Skeletal System | Cmr Lvr Jnp Lmn Rse Ppr Gng Rsm Euc Gpf Mrj Vvr Rvs Crt Pto Spk Hly Cdw Sgc Lim Lts Lmg Mdr Oge Cmm Jsm Amb Cdm Glb Cyp Caj Pne Sge Ppm Thy Nia |
| Nervous System | Cmm Ger Sgc Lvr Rsm Sdw Vvr Cmr Nrl Ppr Ppm Brg Jnp Lmg Pli Cyp Sge Spm Psa Lts Cll Mdr Gpf Oge Ptg Yyg Jsm Rse Ele Amb Cdm Glg Ays Glb Fkc Myr Hly Aca Cdw Euc Pne Sgc Mrj Thy |
| Menstrual System | Cmm Cmr Sgc Lvr Rse Mrj Cyp Fkc Ger Mss Cll Brg Jsm Crt Fnl Myr Jnp Sge Rsm |
| Respiratory System | Sgc Cyp Euc Fkc Hys Lvr Mss Mrj Myr Ppm Pne Rse Rsm Tto Thy Caj Cdw Lmn Sdw Gng Fnl Mrj Lim Lmg Brg Oge Jsm Ger Ele Glb Hly Aca Myt Nia Sge |
| Skeletal System | Lmg Mdr Gpf Oge Cmm Cmr Crt Fnl Gng Glb Myr Vvr Hly Aca Cdw Euc Jnp Cyp Nia Caj Pne Sge Mrj Rsm Thy |

UTILITY: INDICATIONS: PHYSIOLOGICAL

| | |
|---|---|
| Acne | Cmm Cmr Tto Hly Lvr Thy Ger Ptg Gpf Sdw Vvr Ppm Spm Cdw Psa Caj Bnz Crt Lmg Lim Lmn Lts Mdr Brg Oge Yyg Glb Fkc Myt Jnp Nia Pli Sge Sgc Rsm |
| Aging Skin | Crt Rse Pli Ptg Sdw Nrl Fkc Ger Sgc Ele Fnl Glb Myr Psa |
| Arthritis/Rheumatism | Cmm Lmg Lvr Pne Cll Ppr Gng Rsm Clv Mrj Jnp Ger Bnz Crt Hly Lim Lmn Cmr Fnl Glb Myr Myt Euc Cyp Tto Nia Caj Sge Sgc Ppm Thy Vvr Aca Cdw |
| Asthma | Lim Lmn Lvr Rse Glb Myr Hly Myt Euc Cyp Tto Nia Caj Pne Sge Sgc Mrj Rsm Ppm Thy |
| Bruises | Hly Rsm Tto Ger Fnl Lvr Cmr Ele Glb Euc Pli Mrj Thy |
| Cellulite | Gpf Lmg Cdw Cyp Fnl Jnp Lmn Pne Rsm Lim Mdr Oge Nrl Ger Psa Pli Sge Sgc Sdw Thy |
| Excema/Dry Skin | Cmm Cmr Cdw Ger Jnp Lvr Rse Crt Hly Psa Brg Jsm Fkc Myr Aca Pli Sge Sgc Rsm Ppm Thy Sdw |
| Flu | Clv Fkc Tto Pli Thy Lmn Rvs Cll Gpf Lmg Lim Brg Oge Pte Lvr Ele Fnl Gng Glb Sdw Myr Hly Aca Cdw Myt Euc Jnp Cyp Nia Caj Pne Sge Sgc Mrj Rsm Ppm |
| High Blood Pressure | Lim Lmn Lts Yyg Lvr Glb Sge Sgc Mrj |
| Hormonal Imbalance | Fkc Ger Rse Cyp Fnl Caj Ppm Mrj Pne Rsm Sge Sgc Clv Thy Jsm Ger Crt Myr |
| Insomnia | Cmr Oge Brg Lmn Mdr Lvr Mss Ger Nrl Rvs Yyg Spk Lnd Ptg Cmm Rse Sdw Vvr Thy |
| Low Blood Pressure | Euc Pne Rsm Ppm Thy |
| Memory Loss | Rsm Lmn Lvr Fkc Rse Lim Mrj Ppm |
| Menstrual Irregularity | Cmr Myr Jnp Caj Ppm Rsm Sgc Vvr Jsm Lvr Rse Ger Crt Fnl Fkc Cyp Sge Mrj Sgc |
| Migraine | Cmr Lmn Euc Lvr Ppm Mss Mrj Rsm Spm Gpf Lmg Lts Cll Cmm Rse Cdm Aca Pli Sge Sgc Thy |
| Muscle Tension | Cmr Jnp Lvr Hly Rvs Bnz Crt Pto Gpf Lmg Lts Cmm Jsm Rse Amb Cdm Glg Gng Glb Vvr Euc Cyp Nia Caj Pne Sge Sgc Mrj Rsm Ppm Thy |
| Nervous Tension | Cmm Cmr Ptg Oge Lmn Mdr Cyp Lvr Sdw Ger Mss Sge Sgc Bnz Spm Jsm Lmg Psa Lts Cll Gpf Brg Nrl Yyg Rse Ele Amb Cdm Glg Gng Ays Glb Fkc Vvr Hly Aca Cdw Euc Jnp Pne Pli Mrj Rsm Ppm Thy |
| Opthalmia | Cmr Thy Crt |
| Wounds | Cmr Bnz Hly Pli Rse Rsm Sge Clv Tgt Thy Hys Lvr Ger Fkc Cdw Brg Lmn Myr Ppm Jsm Psa Cmm Ele Glb Sdw Vvr Euc Jnp Cyp Tto Nia Pne |

UTILITY: INDICATIONS EMOTIONAL:

| | |
|---|---|
| Anguish | Cmm Cmr Yyg Ptg Oge Lmn Mdr Lvr Mss Mrj Ger Thy Bnz Gpf Lnd Lim Brg Nrl Jsm Rse Amb Fnl Ays Sdw Fkc Myr Vvr Aca |
| Anxiety | Cmm Cmr Yyg Nrl Ptg Oge Brg Lmn Mdr Cyp Lvr Mss Mrj Ger Cll Gpf Lnd Lim Lts Jsm Rse Ele Crt Amb Cdm Ays Glb Sdw Fkc Vvr Cdw Jnp Pli Sgc Mrj Rsm Thy Aca |

TABLE 3-continued

LIST OF BODY SYSTEMS AND AILMENTS THAT MAY BE TREATED WITH ESSENTIAL OILS

INDICATORS FOR NAMES OF ESSENTIAL OILS

| | |
|---|---|
| Depression | Cmm Cmr Fkc Nrl Oge Cyp Jnp Lvr Mrj Pne Rsm Thy Sge Sgc Brg Gpf Psa Bnz Jsm Lmg Psa Lim Lmn Mdr Yyg Rse Amb Fnl Ays Sdw Myr Vvr Hly |
| Fatigue | Cll Lmg Mdr Gpf Brg Oge Ptg Nrl Cmm Cmr Lvr Jsm Rse Ger Ele Amb Cdm Glg Gng Ays Glb Fkc Sdw Vvr Hly Aca Cdw Myt Euc Jnp Tto Nia Caj Pne Psa Pli Sge Mrj Rsm Ppm Thy |
| Nervousness | Cmm Cmr Ptg Oge Lmn Mdr Cyp Lvr Sdw Ger Mss Sge Sgc Bnz Spm Jsm Lmg Psa Lts Gpf Brg Nrl Yyg Rse Ele Crt Amb Cdm Glg Ays Glb Fkc Vvr Aca Cdw Jnp Pne Pli Mrj Rsm Ppm Thy |
| Sadness | Cmm Cmr Fkc Rse Ptg Oge Mdr Euc Mss Pne Sgc Thy Gpf Jsm Lnd Lim Lmn Nrl Yyg Lvr Amb Fnl Ays Sdw Myr Vvr |
| Stress | Cmm Cmr Mdr Mrj Lvr Lmn Ger Spk Spm Gpf Jsm Psa Lmg Lim Lts Brg Oge Ptg Nrl Yyg Rse Ele Amb Cdm Gng Ays Glb Sdw Fkc Vvr Hly Aca Cdw Euc Jnp Cyp Pne Pli Sge Sgc Rsm Ppm Thy |
| CAUTIONS: | |
| Diabetes (DO NOT USE) | Aca |
| High Blood Pressure (DO NOT USE) | Hys Rsm Sge Thy Euc Pne |
| Pregnancy (DO NOT USE) | Lmg Clv Hys Ppm Fnl Lvr Euc Ger Sge Sgc Psa Thy Myr Jnp Cmm Cmr Caj Mrj Rse Rsm Vvr Cdw Spm Tgt Hly Spk Crt Bnz Mss Rvs Gng Lim Lmn Lts Cll Mdr Gpf Brg Oge Ptg Nrl Yyg Jsm Ele Amb Cdm Glg Ays Glb Sdw Fkc Aca Myt Cyp Tto Nia Pne Pli |
| Epilepsy (DO NOT USE) | Rsm Fnl Sge Hys Sgc |
| Photosensitizers (DO NOT USE) | Tgt Brg Lmn Lim Gpf Mdr Brg Oge Ptg Nrl Mss Lmg Cll Lts Gng Aca |
| Sensitive Skin (DO NOT USE) | Lim Lmn Lts Cll Lmg Mdr Gpf Brg Oge Ptg Cmr Yyg Jsm Ger Gng Cdw Euc Tto Caj Pne Ppm Thy |

Thus they are on the lower right adjacent to sugar, as opposed to the fusion (+) spices that are toward the middle in the direction of the upper left of the table.

Blends of the use categories that are compatible include universal seasoning-fusion (+) spices, universal seasoning-Euramerican herbs, universal seasoning—Mediterranean herbs, Euramerican herbs-Mediterranean herbs, Mediterranean herbs—fusion herbs, fusion herbs-fusion (+) spices, fusion herbs-fusion (−) spices, fusion (−) spices-Indian spices, fusion (+) spices-Indian spices, fusion (+) spices-Indian spices, fusion (+) spices-fusion (−) spices, Indian spices-Asian spices, Asian spices-fusion (−) spices, and fusion (−) spices-universal sweetening. It should be understood that intermixing the above blends would also yield a pleasing flavor, as long as there is a common compatible use category. For example, a blend of Euramerican herbs-Mediterranean herbs-fusion herbs will produce a pleasing flavor since the Mediterranean herbs category is compatible with both the Euramerican herbs category and the fusion herbs category.

Referring to FIG. 3, the table of herbs and spices 10 is an arrangement of herbs and spices commonly used in the kitchen. The herbs and spices are classified and structured into a utilitarian system for selection and blending. Herbs and spices are commonly arranged alphabetically, or at random. This table 10 provides a utilitarian structure for everyday use, cultural relationships and experimental blending. The table 10 provides the structure for which these herbs and spices should be organized and stored within the kitchen so that access to herbs and spices often used in conjunction is easy—commonly used herbs and spices with similar properties are grouped accordingly and adjacent to one another. This table of herbs and spices 10 is the result of extensive research from sources within the field of culinary arts and sciences.

The table may be interpreted as one would a geographical map of the world, with Western herbs situated on the left of the table, and with Eastern spices situated on the right of the table. This table is one large transition—from salty to sweet from the top left to bottom right of the table, from Western to Eastern cultures from the left to right of the table, and herbs to spices from the left to right and the top to bottom of the table.

Spices commonly associated with sugars or those that have an inherently sweet flavor are positioned in cells towards the bottom right of the table, directly opposite the salty and hot flavors on the top left. The sweet flavors are positioned the farthest apart from the salty and hot flavors. For instance, vanilla, which lies at the bottom right of the table, is almost always used in a sweet dish, whereas basil, which lies near the top left of the table, is almost always used in conjunction with salt and pepper. Thyme lies directly below basil. Therefore, one can interpret that basil and thyme have a relationship that basil and vanilla do not. The herbs and spices in between vanilla and basil transition ingredient to ingredient from salty to sweet as one goes from left to right of the table.

Like the essential oils, each herb or spice is also assigned a note—top, middle or base. The note assigned refers to the intensity of its flavor. The positive and negative signs and the notes do correlate, as intensity and digestive activity are related. The assignment of a (+) or (−) charge and the assignments of notes (top, middle, base) are derived from the same sensibilities of the table of essential oils. For spices, a top note is sharp and intense (like essential oil top notes), a middle note, less sharp yet flavorful, and a base note relatively neutral in flavor intensity such as salt or sugar. Generally speaking, herbs and spices that are top notes are sharp in flavor, and also stimulate digestive activity. In both cases of notes and positive/negative charges, these have been assigned in this table to add a dimension of specificity to the use of each herb and spice as is present in the table of essential oils. The assignments are derived by the inventor, and not well known within the field as such, although there is information available about the properties of herbs and spices to support the idea of assigning these values.

Herbs that have a relationship to a spice are positioned in adjacent cells. One classic example of this is cilantro and coriander. Cilantro is a seed-bearing plant, and coriander is its seed. Independently, these two herbs and spices are conventionally used in Western and Eastern dishes, respectively. Yet, they have a taxonomic relationship, where the same plant yields an herb and a spice. Though they are distinct, and characteristic of separate ethnic dishes, their similarities make for compatible blending, particularly in fusion dishes. Thus, they are positioned in adjacent cells 300 and 302 in the table.

A similar example, one in which two adjacent cells correspond to herbs and spices that are not from the same taxonomic species, is tarragon and anise. Tarragon is an herb with an anise-like flavor while anise is a spice. They are in separate use categories, but their flavor is similar. Thus, they are positioned in adjacent cells 310 and 312 in the table.

In FIG. 3, the categories are arranged in the table such that the universal seasoning category 200 is positioned adjacent to the Euramerican herbs category 230 and the Indian spices category 210. The Asian spices category 220 is positioned adjacent to the universal sweetening category 280 and Indian spices category 210. Typically, the universal seasoning category 200 includes salt, sea salt, pepper, cayenne pepper, tomato, onion, garlic, white pepper, red pepper and lemon; the universal sweetening category 280 includes brown sugar, vanilla and sugar; the fusion (+) spices category 260 includes coriander, cumin, fennel and anise; the Indian spices category 210 includes chili, paprika, mustard, mild curry, hot curry, turmeric and fenugreek; the Asian spices category 220 includes horseradish, wasabi, and ginger; the fusion (−) spices category 270 includes cardamom, clove, mace, cinnamon, allspice and nutmeg; the Mediterranean herbs category 240 includes oregano, savory, bay, basil, thyme and rosemary; the Euramerican herbs category 230 includes chive, dill, mint, marjoram, chervil and celery; and the fusion herbs category 250 includes parsley, sage, saffron, cilantro and tarragon.

In general, the method further includes arranging cells in the categories as shown in the table below:

| Salt | Sea Salt | Pepper | Cayenne | Tomato | Chili | Paprika | Mustard | Horseradish | Wasabi |
|---|---|---|---|---|---|---|---|---|---|
| Onion | | | | | | | | | Ginger |
| Chive | | | | | | | | | Allspice |
| Dill | | | | | | | | | Brown Sugar |
| Mint | Celery | Bay | Rosemary | Saffron | Tarragon | Anise | Mace | Vanilla | Sugar |

The method also includes arranging the cells as shown below:

| Salt | | Pepper | | Tomato | | | Mustard | | Wasabi |
|---|---|---|---|---|---|---|---|---|---|
| | | | | Lemon | Curry (mild) | Curry (hot) | Tumeric | | Ginger |
| | | | | Parsley | Coriander | Cumin | | | |
| | | | | | Cilantro | Fennel | | | |
| Mint | | | | | Tarragon | Anise | | | Sugar |

Like the blends of essential oils, most blends of herbs and spices will cross use categories to create a shape—either taking the shape of a cluster, or a diagonal or a horizontal line across the rows. Conventional blending is done within a use category, whereas unconventional blending can take the form of a fusion. For instance, Indian and Asian foods are spice dominant, while European-American foods are mostly herb dominant. A fusion incorporates herbs and spices of both. Thus, Middle Eastern herbs and spices, which include herbs and spices that are used in both Eastern and Western cultures, are classified as fusion herbs and fusion spices.

The table makes access to herbs and spices commonly used in conjunction with one another in conventional blending methods simple and intuitive. With regard to fusion blending, the table draws connections between cultures where adjacent cells of the same or different use category are herbs and spices that share characteristics that are compatible. Though they are independently characteristic of their respective culture, there is a commonality between them that allows for blending, which is referred to as fusion cooking—cooking across the boundaries of ethnic convention.

This table seeks not to establish boundaries between cultures, but rather, to show that there is a full spectrum between them, allowing for great possibility in experimentation, which, in effect, diminishes the borders between cultures through the commonalities we share in our lives—ethnically, socially and politically. Cooking has a rich history tied to tradition, culture, religion and geography. Globalization brings us many advantages in sharing that makes us distinct from one another. The table is, therefore, a larger message—a metaphor for the full spectrum of world culture by way of our cultural practices in cuisine.

Figure 4:
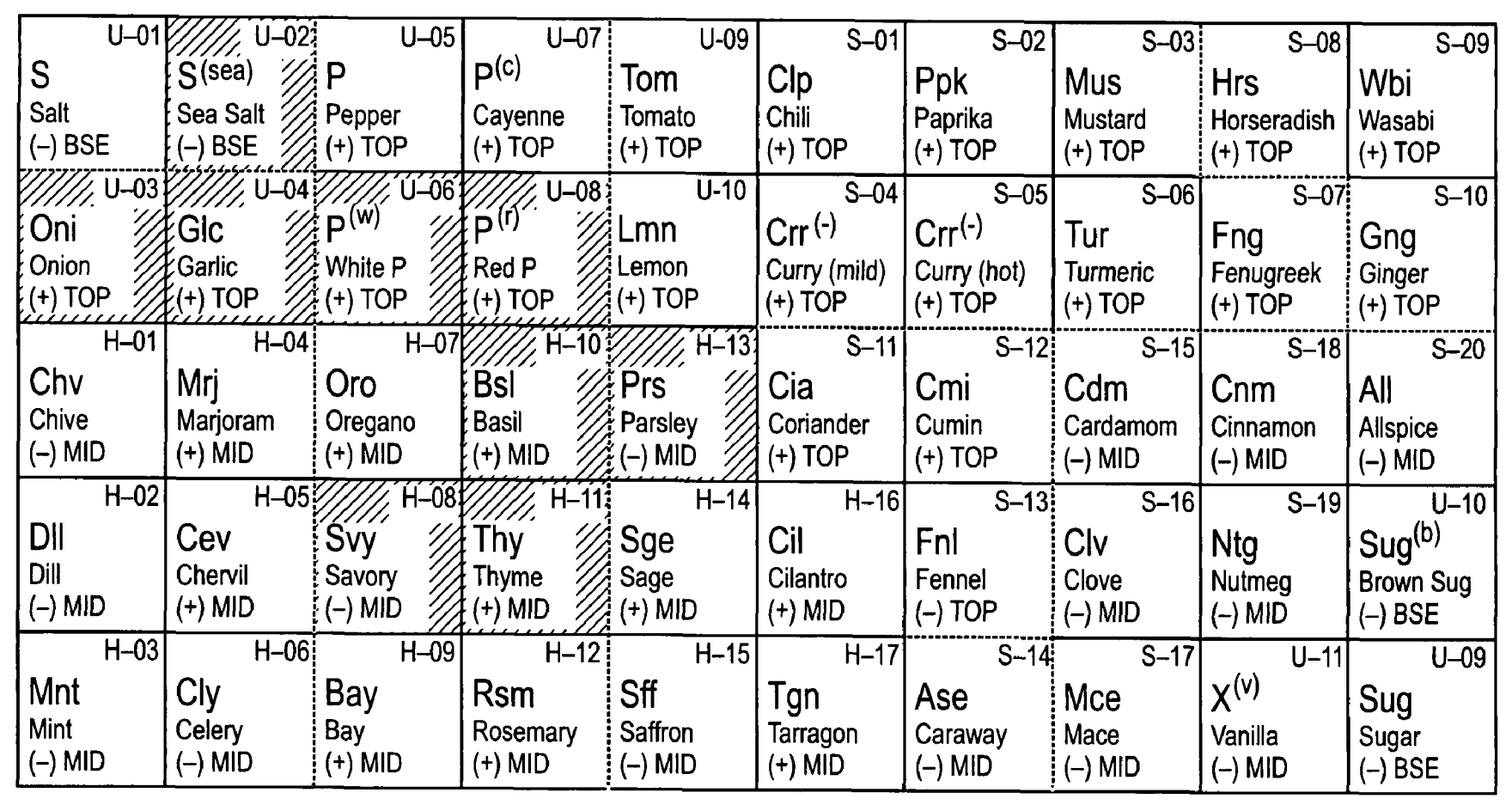

The following examples further illustrate the utility of the table. In FIG. 4, a typical Western Mediterranean blend is highlighted. This blend consists of sea salt, onion, garlic, white pepper, red pepper, basil, parsley, savory and thyme. This blend is useful in recipes for rustic marinara sauce and vegetable sauté in extra virgin oil.

In FIG. 5, a typical Eastern Indian blend is highlighted. This blend consists of salt, pepper, cayenne, tomato, chili, paprika, onion, garlic, red pepper, mild curry, hot curry, turmeric, fenugreek, ginger, coriander, cumin, cardamom, cinnamon and fennel. This blend is useful in recipes for tandoori tofu, cauliflower marinade and chana masala.

The first two examples in FIGS. 4 and 5 are ethnically conventional blends. Both are classic recipes.

The third example highlighted in FIG. 6 is more unconventional and of the fusion style. The blend includes sea salt, pepper, cayenne, chili, paprika, onion, garlic, red pepper, lemon, mild curry, parsley, coriander, cumin and cilantro. This blend is useful in recipes for chick pea chili and hummus. This example also incorporates the herbs and spices of three separate cultures to yield an international flavor.

As one can see from these examples, there are a variety of ways to use the table. One can blend from within use categories or across different use categories. The closer the herbs and spices are, the more likely the ultimate flavor will be recognizable when blended. Blending in directions away from a use category in the direction of another, or blending across a row or column using herbs and spices spaced far apart will result in a fusion.

This result may be intuitive considering adjacent cells designate herbs and spices that are compatible with one another, yet the structure of the table itself is unique and has the ability to display this visually. The reason this structure works in this way is because the aesthetics from one use category to another transition herb by herb and spice by spice, from left to right, top to bottom and diagonally. The function of this grid is the blender's starting point. It is their structure for experimentation. Nothing prevents anyone from experimenting more radically than working within the table to develop new and improved botanical ingredient blends.

What is claimed is:

1. An electronic method implemented over an electronic medium for providing blending combinations of botanical ingredients to produce a desired effect, the method comprising:

receiving characteristics of desired organoleptic effects;

receiving organoleptic information about a plurality of botanical ingredients;

accessing a data structure containing information reflecting relationships between categories of organoleptic effects and blending combinations, wherein the data structure includes information characterizing the plurality of botanical ingredients and information about suitability of combining at least some of the plurality of botanical ingredients with other of the plurality of botanical ingredients, wherein the data structure is provided in an electronic table of botanical ingredients for blending combinations that produce a pleasing, desired organoleptic effect, comprising different groups of cells of the table, each group comprising ingredients that possess varying degrees of similarity in one or more characteristics, and each cell corresponding to a single ingredient, wherein the groups are arranged in the table such that adjacent cells in the same or different groups correspond to ingredients that possess the closest similarities in one or more characteristics;

storing an electronically-implemented classification system of the organoleptic information;

identifying, using the electronically-implemented classification system, blending combinations; and providing the blending information to a user.

2. The method of claim 1, wherein the combinations of botanical ingredients is desired to produce a health-related benefit.

3. The method of claim 1, wherein the plurality of botanical ingredients are derived from one or more parts of a plant.

4. The method of claim 3, wherein the plurality of botanical ingredients are selected from one or more from the group consisting of essential oils, herbs, and spices.

5. The method of claim 1, wherein the combinations of botanical ingredients produce a pleasing, desired organoleptic effect.

6. The method of claim 5, wherein the characteristics of desired organoleptic effects is one or more selected from fragrance, taste, color or texture.

7. The method of claim 6, wherein the desired organoleptic effect is fragrance and the botanical ingredients are essential oils derived from one or more parts of a plant.

8. The method of claim 7, wherein the relationship is according to the plant part from which the essential oil is obtained, wherein the plant parts comprise fruits, flowers, seeds, leaves, bark and roots.

9. The method of claim 6, wherein the fragrance is classified under one or more of the following classes: citric, floral, spicy, earthen, woody, herbal or minty.

10. The method of claim 9, wherein the data structure provides an organoleptic relationship between the citric class and the floral class and the spicy class.

11. The method of claim 9, wherein the data structure provides an organoleptic relationship between the minty class and the woody class.

12. The method of claim 9, wherein the citric class comprises lime, lemon, citronella, lemongrass, mandarin, grapefruit, bergamot, orange and petitgrain; the floral class comprises neroli, chamomile moroccan, chamomile roman, ylang-ylang, lavender, jasmine, and geranium; the spicy class comprises carrot seed, sweet fennel and ginger; the earthen class comprises sandalwood, frankincense, myrrh, vetiver, and cedarwood; the woody class comprises eucalyptus, tea tree, juniper, cajuput, cypress and pine; the herbal class comprises palmarosa, clary sage, marjoram, sage, and rosemary; and the minty class comprises peppermint.

13. The method of claim 12, further comprising arranging the cells of the electronic table in the classes as shown in one of the tables below:

| Lime | Lemon |  | Citronella | Lemongrass |  |  | Marjoram |  |  |
|---|---|---|---|---|---|---|---|---|---|
| Mandarin |  |  |  | Lavender |  |  |  |  |  |
| Orange |  | Neroli |  |  |  |  |  |  |  |
|  |  |  |  |  |  |  |  |  | Cajuput |
|  |  |  | Ginger | Vetiver |  |  |  | Cypress | Pine |

| | Lemon | | Citronella | Lemongrass | | | | | |
|---|---|---|---|---|---|---|---|---|---|
| Mandarin | | | | | | | | | |
| | | Petitgrain | | | Geranium | | | Eucalyptus | |
| | | | Ylang-Ylang | | Sandalwood | Frankincense | | | |
| | | | Ginger | Vetiver | | | | | |

14. A computer-implemented method of identifying a combination of botanical ingredients producing an organoleptic, the method comprising:
- maintaining information characterizing a plurality of botanical ingredients;
- electronically maintaining information about suitability of use of at least some of the plurality of botanical ingredients with other of the plurality of botanical ingredients;
- receiving from a user a selection of at least two of the plurality of botanical ingredients;
- processing, using an computer processor, information characterizing a blending of the at least two selected botanical ingredients and suitability of use information to produce one or more desired organoleptic effects; and
- providing the organoleptic effects of the blending to a user.

15. The method of claim 8, further comprising:
- generating the combination of botanical ingredients; and
- dispensing the combination to a user.

16. A system for providing information for the preparation of blending combinations of botanical ingredients to produce a desired effect, the system comprising:
- a data structure containing information reflecting relationships between categories of botanical ingredients and one or more desired effects, wherein the data structure includes information characterizing a plurality of botanical ingredients and information about the suitability of combining at least some of the plurality of botanical ingredients with other of the plurality of botanical ingredients to produce the one or more desired effects, wherein the data structure is provided in a table of botanical ingredients, comprising different groups of cells of a table, each group comprising ingredients that possess varying degrees of similarity in one or more characteristics, and each cell corresponding to a single ingredient, wherein the groups are arranged in the table such that adjacent cells in the same or different groups correspond to ingredients that possess the closest similarities in one or more characteristics;
- an electronic database, configured to receive and process the information reflecting relationships, to identify a combination of botanical ingredients to produce the desired effect; and
- an interface for conveying the identified combination of botanical ingredients to a user.

\* \* \* \* \*